(12) United States Patent
Winters (10) Patent No.: US 10,277,941 B2
(45) Date of Patent: Apr. 30, 2019

(54) METHOD AND APPARATUS FOR PRODUCING FULL SYNCHRONIZATION OF A DIGITAL FILE WITH A LIVE EVENT

(71) Applicant: ION Concert Media, Inc., Eden Prairie, MN (US)

(72) Inventor: Scott William Winters, Belle Plaine, MN (US)

(73) Assignee: ION Concert Media, Inc., Eden Prairie, MN (US)

( * ) Notice: Subject to any disclaimer, the term of this patent is extended or adjusted under 35 U.S.C. 154(b) by 337 days.

(21) Appl. No.: 15/236,917

(22) Filed: Aug. 15, 2016

(65) Prior Publication Data

US 2016/0353154 A1    Dec. 1, 2016

Related U.S. Application Data

(63) Continuation of application No. 14/308,634, filed on Jun. 18, 2014, now Pat. No. 9,445,147.

(60) Provisional application No. 61/956,838, filed on Jun. 18, 2013.

(51) Int. Cl.
| | |
|---|---|
| *H04N 21/43* | (2011.01) |
| *G11B 27/10* | (2006.01) |
| *H04N 21/414* | (2011.01) |
| *H04N 21/472* | (2011.01) |
| *H04N 21/81* | (2011.01) |

(52) U.S. Cl.
CPC ......... *H04N 21/4307* (2013.01); *G11B 27/10* (2013.01); *H04N 21/41415* (2013.01); *H04N 21/47205* (2013.01); *H04N 21/8113* (2013.01)

(58) Field of Classification Search
CPC .................................................. H04N 21/4307
USPC ........................................................... 715/722
See application file for complete search history.

(56) References Cited

U.S. PATENT DOCUMENTS

| | | | | |
|---|---|---|---|---|
| 4,097,135 A | * | 6/1978 | Castor .................... | G09B 5/067 352/17 |
| 5,092,216 A | * | 3/1992 | Wadhams ............... | G09B 15/00 84/462 |
| 5,225,618 A | * | 7/1993 | Wadhams ............... | G09B 15/00 84/462 |
| 5,333,299 A | * | 7/1994 | Koval ..................... | G06F 8/458 370/503 |

(Continued)

OTHER PUBLICATIONS

"U.S. Appl. No. 14/308,634, Notice of Allowance dated May 12, 2016", 11 pgs.

(Continued)

*Primary Examiner* — Reza Nabi (57) ABSTRACT

A method and apparatus are provided for producing full synchronization of a digital file with a live event. Using time-based cues such as musical beats, the live event is time mapped. The video file to be synced is measured in frames per second is then translated from its frames per second original time code into the time code of the live event in beats per minute making it possible to measure the playback rate of the source media file in the same units of measurement as the live event. The result is a playback mechanism that allows for more precise real time playback rate corrections by an operator by providing a visible cue so they can better keep the source media synced with the live event, even if there are real time tempo variations in the live event.

12 Claims, 8 Drawing Sheets

(56) References Cited

U.S. PATENT DOCUMENTS

| | | | | |
|---|---|---|---|---|
| 5,453,570 A * | 9/1995 | Umeda | G09B 15/00 434/307 A |
| 5,479,351 A * | 12/1995 | Woo | G11B 27/10 348/515 |
| 5,690,496 A * | 11/1997 | Kennedy | G09B 15/003 345/473 |
| 5,974,015 A * | 10/1999 | Iizuka | G10H 1/0041 369/47.16 |
| 7,105,733 B2 * | 9/2006 | Jarrett | G10H 1/0008 84/483.2 |
| 7,518,053 B1 * | 4/2009 | Jochelson | G10H 1/40 84/603 |
| 7,589,727 B2 * | 9/2009 | Haeker | G10H 1/0008 345/440 |
| 7,790,975 B2 * | 9/2010 | Eastwood | G10H 1/368 84/611 |
| 8,591,332 B1 * | 11/2013 | Bright | A63F 13/42 273/460 |
| 9,445,147 B2 | 9/2016 | Winters et al. | |
| 9,977,643 B2 * | 5/2018 | Lothian | G06F 3/165 |
| 2004/0025668 A1 * | 2/2004 | Jarrett | G10H 1/0008 84/477 R |
| 2004/0060070 A1 * | 3/2004 | Mizushima | G11B 27/105 725/110 |
| 2006/0086234 A1 * | 4/2006 | Jarrett | G10H 1/0008 84/483.2 |
| 2006/0156906 A1 * | 7/2006 | Haeker | G10H 1/0008 84/609 |
| 2006/0254407 A1 * | 11/2006 | Jarrett | G10H 1/0008 84/601 |
| 2008/0097633 A1 * | 4/2008 | Jochelson | A63B 71/0686 700/94 |
| 2008/0196575 A1 * | 8/2008 | Good | G09B 15/04 84/470 R |
| 2011/0023691 A1 * | 2/2011 | Iwase | G10H 1/0066 84/612 |
| 2011/0036231 A1 * | 2/2011 | Nakadai | G10H 1/361 84/477 R |
| 2011/0252951 A1 * | 10/2011 | Leavitt | G10H 1/40 84/645 |
| 2011/0319160 A1 * | 12/2011 | Arn | G10H 1/368 463/30 |
| 2013/0032023 A1 * | 2/2013 | Pulley | G10H 1/0066 84/645 |
| 2013/0319209 A1 * | 12/2013 | Good | G09B 15/04 84/483.2 |
| 2014/0254806 A1 * | 9/2014 | Fonseca, Jr. | H04R 29/008 381/56 |
| 2014/0260907 A1 * | 9/2014 | Matsumoto | G10H 7/02 84/604 |
| 2014/0372891 A1 * | 12/2014 | Winters | G11B 27/10 715/722 |
| 2015/0160916 A1 * | 6/2015 | Lothian | G06F 3/165 715/719 |
| 2016/0351229 A1 * | 12/2016 | Liu | G11B 27/102 |

OTHER PUBLICATIONS

"U.S. Appl. No. 14/308,634, Preliminary Amendment filed Jul. 22, 2015", 4 pgs.

* cited by examiner

METHOD AND APPARATUS FOR PRODUCING FULL SYNCHRONIZATION OF A DIGITAL FILE WITH A LIVE EVENT

RELATED APPLICATION

This application is a continuation of Published United States Patent Application Publication No. 2014/0372891 (Ser. No. 14/308,634) filed Jun. 18, 2014 and entitled "METHOD AND APPARATUS FOR PRODUCING FULL SYNCHRONIZATION OF A DIGITAL FILE WITH A LIVE EVENT", which Application claims the benefit of U.S. Provisional Application Ser. No. 61/956,838, filed Jun. 18, 2013 and entitled "Method and Apparatus for producing full synchronization of a digital file with a live event", to each of which priority is claimed and the entireties of which are incorporated herein by reference.

FIELD OF THE INVENTION

The present invention relates generally to the syncing of a linear event with a nonlinear event and more particularly for the syncing of digital video files to a live performance.

BACKGROUND OF THE INVENTION

Syncing digital media to performances in music concert settings is not a new practice. Sync methods have been developed in the club scene, the classical concert hall and other music venue types. Existing sync methods generally fall into the following categories:
1. Scrubbing. Scrubbing is a well-known audiovisual editing technique that allows an individual to increase or decrease playback rates of digital files. Scrubbing is most often accomplished manually as a way to achieve a rough, imprecise sync so no particular consideration is given to matching rhythmic cue points. As a result this approach is not well suited to produce a full and careful sync.
2. Beat Matching. Beat matching is a method that has been used in dance clubs by disk and video "jockeys" for many years. This method could be described as a more sophisticated form of scrubbing where the digital media to be synced is mapped to the beat or pulse of a second media file. In this method playback of the first media file is stretched or condensed to sync the downbeats of the two media files in an attempt to seamlessly blend the tempo of the two. The drawbacks to this method are that one needs to pre-set the beat sync before the live performance since there is no completely efficient way to accomplish this function in real time. This method assumes that tempo of the video will remain unchanged, with the operator adjusting the playback rate of the audio files to match the video.
3. Click Tracks Click tracks have been used in soundtrack recording sessions for many years and have more recently been adapted for use in live concert performances. The "click" is an audio metronome embedded in the media file to be synced. The "click" is fed through earpieces to the musicians who essentially play along to the tempo they hear. The audience never hears the "click" and so long as the musicians stay "on the click" the sync between digital file and live performance will be perfect.
4. Video Chapters. During the editing process the video file is divided into chapters with new chapters beginning at assigned cue points in a musical score. When the live performance reaches a cue point the video file is advanced to the next chapter, either manually or by a computer process designed to identify the cue points through pitch recognition or some other score reading technique. Video chapters have also been used to sync movie files to music.

In each category above, the sync achieved is either very imprecise and or it requires pre-recorded music with a perfectly steady beat such as computer generated "techno" music. Also, none of the foregoing methods are satisfactory in the situation where a live performance of a piece of music, a play, a dance or the like is to be precisely synced with a digital media file. The problem stems from the fact that no two live performances of the same piece are the same due to inherent tempo variations that occur, and this result holds true even if performed by the same individuals. These tempo variations occur because human beings are not capable physiologically of performing with the millisecond precision of a digital timing device, and due to the fact that artists will purposefully and for artistic effect increase or lower the tempo of a particular section of the live performance. However, a pre-recorded audio or video track is an invariable replica of one particular performance with all of its particular intrinsic tempo variations. As a result, pre-recorded audio or visual tracks will invariably become out of sync with live performances as a joint performance thereof proceeds.

What is missing is a system that provides for a way of syncing a live performance with all of its inherent variability with a static digital video file. However, each existing method described above fails because the approach focuses on trying to match the live performance to the invariable recorded work, and generally lacks in precision, flexibility, artistry or a combination of thereof. Thus, prior art syncing techniques fail to provide for the needed fluidity, flexibility and accuracy required for transitions from one tempo to the next and/or from one musical section to the next. Prior art syncing techniques can allow for some rate variations, but only where they are very small, and/or very infrequent or also require that the tempo is set or determined by the recorded media, not the live performance.

SUMMARY OF THE INVENTION

The present invention comprises a new approach to syncing of a prerecorded video media file with a live performance. In the present invention, unlike the prior art, the live performance dictates the tempo and transition changes and provides for adjusting the playback rate of the fixed recorded media accordingly. In most cases the video file represents a video recording to which music has been previously adapted, as for example Disney's® Fantasia®. Of course, the original sound recording has its own unique tempo on a microsecond basis and was edited along with the animation to produce a well-timed finished work. If a conductor or musical group would like to play the same music live along with a projection of that animated piece, with the original soundtrack thereof muted, then the playback rate of the video must be adjustable to fit the tempo of the live performance which will inevitably be different from the original.

Such control is provided by a control device, such as a tablet computer, that is connected wirelessly or by wire to another separate computer containing software specifically designed to vary the rate of playback of the prerecorded media, based upon input therefrom. The controller is operated by an individual who has a full and detailed view of the live performance. Thus, in the case of an orchestra playing with a pre-recorded video, the operator of the controller may be in the orchestra with a close connection to the musicians and in direct sight of the conductor. The controller includes a slide bar function comprising an actual mechanical or virtual slide switch/button that the operator can move back and forth thereby advancing or retarding the playback of the video. In the hands of a skilled operator the controller becomes somewhat of a musical instrument that the operator "plays" to achieve the desired syncing effect. This approach provides orchestras and the like with a much wider range of artistic control and possibilities for syncing with a full range of pre-recorded works.

DETAILED DESCRIPTION OF THE INVENTION

Figure 1:
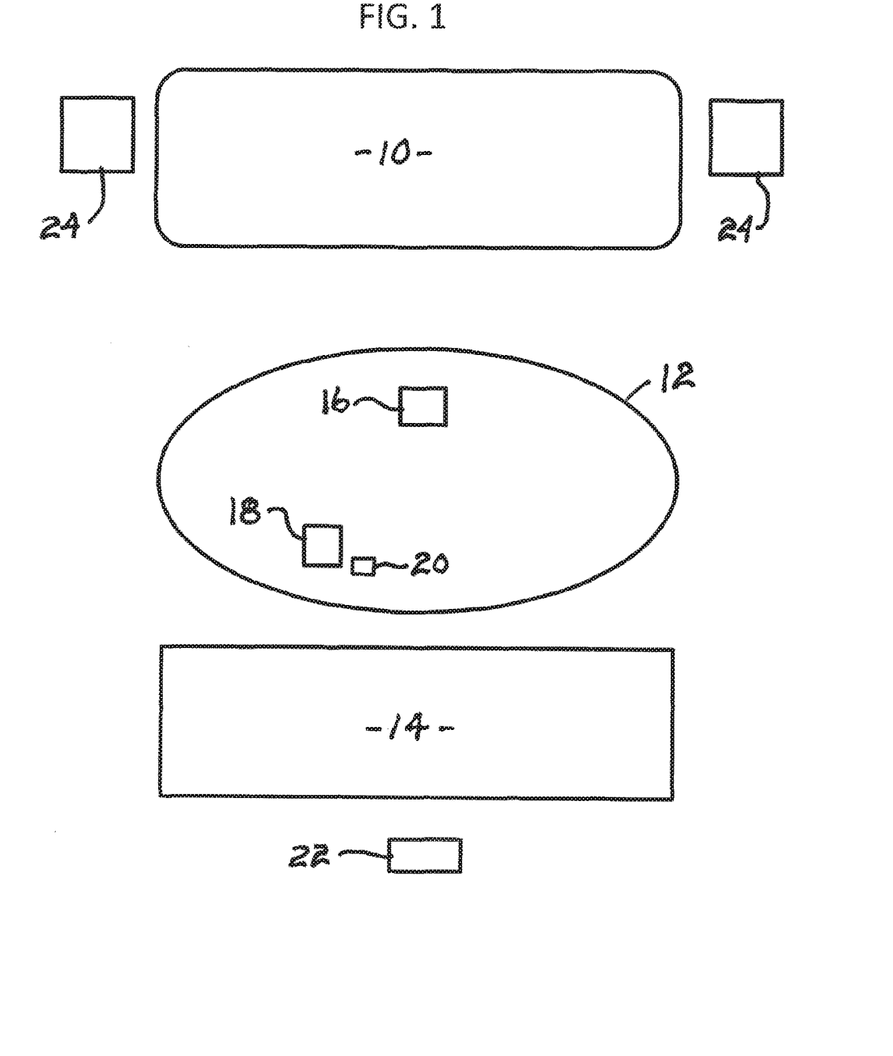
FIG. 1 shows a standard concert hall performance setting.

As seen by first referring to FIG. 1, a concert hall is shown schematically and includes a projection screen 10, orchestra on stage 12, audience seating area 14, a conductor position 16, a user/operator position 18, a computer 20, a projector 22 and a sound system 24. The operator or user is seated with the musicians in the orchestra 12 so that he or she has a full view of the conductor, the projection screen 10 and the stage, and of course can hear any audio output of sound system 24. Computer 20 is connected by wire or wirelessly to projector 22 and sound system 24.

Figure 2:
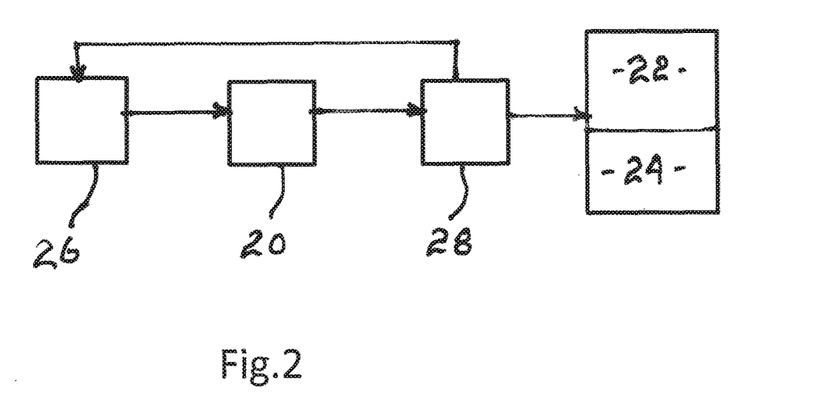
FIG. 2 shows a basic data flow overview.

A rate control device 26, shown schematically in FIG. 2, is used by an operator to adjust the playback rate of a recorded video contained in the memory of computer 20 the video steam of which is communicated to projector 22 for projection onto screen 10. The playback rate adjustment/user interface can be accomplished mechanically, as for example with a slider switch, roller ball, mouse or wireless motion mapping controller as seen in use in various video game and computer applications, and/or with a computing device having a touch screen on which various controls can be represented graphically and operated by touch contact therewith. Examples of suitable hardware for controller 26 include, but are not limited to, an Apple®, Windows® or Chrome® based tablet computer, a Windows®, Apple® or Linux® based notebook computer, an Apple® or Android® based smart phone, hardware controllers, such as; an Akai®. APC40, Ableton®. Push, Native Instruments®. Maschine, or game controllers, such as used with gaming systems, including, for example, Xbox One®, Xbox 360®, Playstation 3®, Playstation 4®, Wii®, or WiiU®.

Rate Control Device 26 is connected wirelessly by Bluetooth®, or a suitable WiFi protocol or by wire, such as through a USB, Ethernet or firewire connection, to computer 20. A specially designed application software 28 of the present invention is downloaded into computer 20. The software 28 provides for responding to input from controller 26 as will be described in greater detail herein, to adjust the playback speed of a prerecorded video file. The time adjusted media signal is output from the software 28 to the projector 22 and sound system 24.

Figure 3:
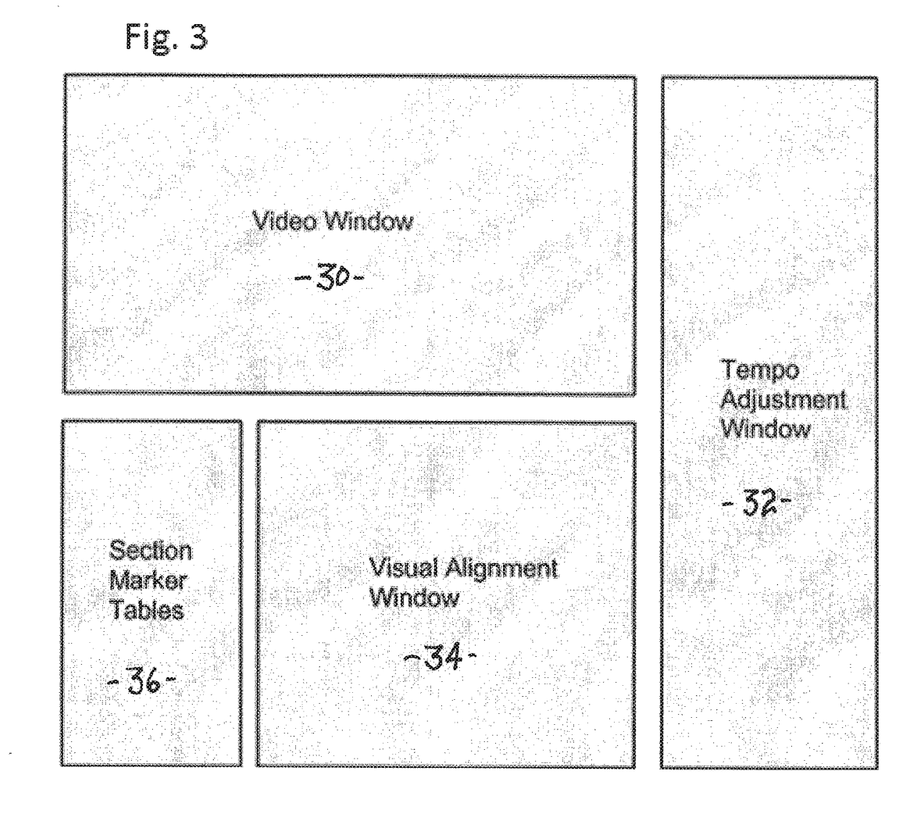
FIG. 3 shows an example of a controller/user graphical user interface.

FIG. 3 depicts the user interface of the software 28 as displayed on the screen of a controller. Each of the sections of this interface will be described in more detail below. In the upper left there is a video window 30 which displays video images exactly as they are output to the projector 22. On the right is the Tempo Adjustment Window 32 which the operator uses to adjust the playback speed of the video file. The lower center section is the Visual Alignment Window 34 which acts like a visual metronome and is used by the operator to monitor the sync in real time. The lower left section is the Section Marker Tables area 36, which contains tempo and time signature data that is manually entered prior to a performance.

The video window 30 provides a visual monitor of the images being outputted to the projector 22. The video window 30 is driven by a movie player that is embedded into software 28. The movie player is capable of playing movie files encoded in various formats such as .MP4, .MOV, .AVI and the like. The video player built in to the program is a software-based video player that plays only digital files. As is understood by those of skill, the video player is part of a built-in Standard Development Kit (SDK) as is available to any programmer in the programming language in which they are working. Inside the SDK are key elements intended to be used as "building blocks" for application development, one of which is a video player. The video player knows how to communicate with the video display hardware, read certain types of files, and distribute frames over time in a predictable way. Depending on the platform, the video player from the SDK may or may not have the ability to alter the time of a video. i.e., play it faster or slower. As is well understood this functionality can be added to the video player, or in the case of an SDK that allows for speed control, taken advantage of via code formatting to achieve the desired effect.

Figure 4:
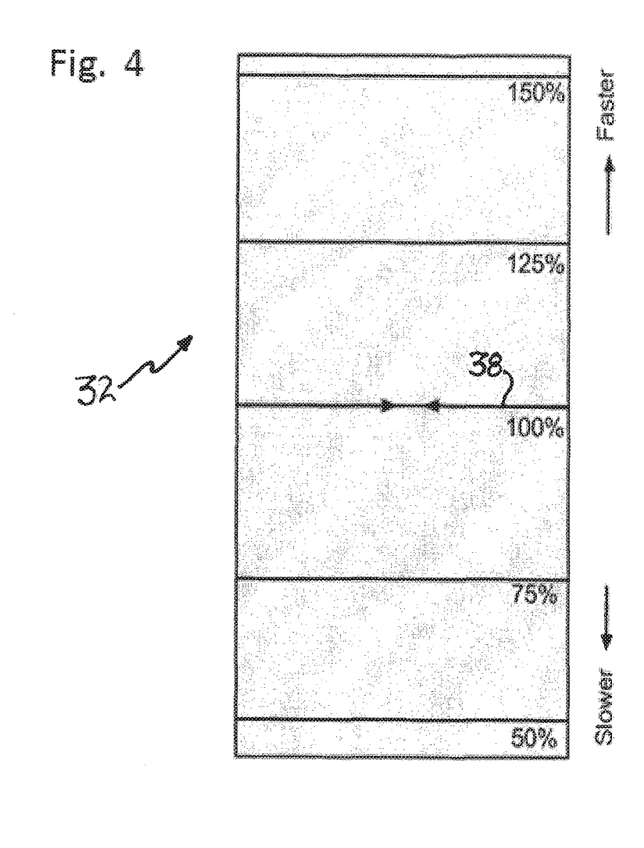
FIG. 4 shows a detailed view of the tempo adjustment window of FIG. 3.

The tempo adjustment window 32 is shown in greater detail in FIG. 4. This window is a display of the degree to which the operator is altering the speed of the video in the Video Window 30. A vertically moving horizontal line called the tempo indicator 38 indicates the percentage that the video is being played faster, or in the case of a percentage less than 100%, slower. When this display shows the video is being played at a speed of 100%, as in FIG. 4, the video is being presented unaltered—at its original speed. In other words, 100% playback rate=100% of normal or unaffected playback speed. Thus, 200% would be twice as fast as the original, and 50% would be half the speed of the original.

In the present invention the manipulation range is desirably set to allow the operator to adjust between 50% and 150% of the original tempo. Thus, one minute worth of video at 100% would take 45 seconds at 150%, that is, half again as fast. At 75%, that one minute would be played back at 75% of the speed, which would take one minute and 30 seconds, and at 50% or half speed that one minute would take 2 minutes. For reasons of practicality, the adjustment is typically limited to 150% of the original tempo, and 50% thereof. While adjustments with this system could happen beyond this scale, for most situations limiting to this range has the benefit of avoiding excessive pixilation and distortions in the video.

Figure 5:
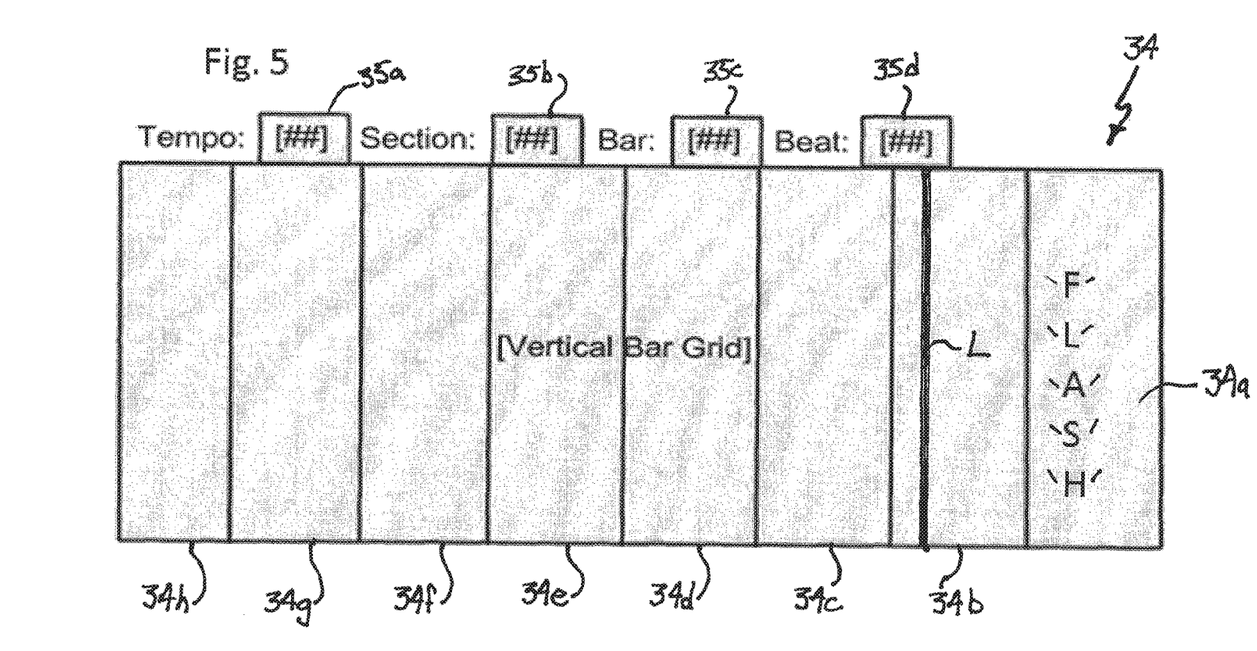
FIG. 5 shows a detailed view of the visual alignment window of FIG. 3.

As seen in FIG. 5, the visual alignment window 34 shows the current tempo after adjustments. The entirety of right-most box 34a flashes, turns a solid color, at the moment the current beat or event occurs. This visually displayed tempo is the tempo of the digital media, not the tempo of the live performance. It is the job of the operator to match this visual tempo with what they hear of the live performance and make adjustments as necessary by using the tempo adjustment window 32. For example, if this box flashes before the 'live' beat, it means they need to slow down the playback of the prerecorded media file until it matches, and flashing after indicates a need to speed up the playback of the prerecorded media file to match the live performance. The flashing of box 34a is always calculated by the formula: [Original Tempo of current section]×[Current setting of Tempo Adjustment Window], the details of which are described herein below.

After the right-most box 34a flashes, it shifts to the left by one division of the beat to box 34b traveling left to right now as a non-flashing vertical and narrower bar or line L thereby making room for the next division of the beat to flash in the right-most box 34a. On the next division of the beat, the shift happens again, and so on until the left-most box 34h receives the beat bar 8 divisions of the beat later. All rectangles in the grid 34b-h are then in the past so to speak except for the right-most box 34a, which indicates the current beat.

The tempo field tab 35a displays the current tempo of the performance of the digital media. The number displayed in this box is not directly adjustable by the user. This number is constantly changing and updating in real-time to display the current tempo of the digital media as it is adjusted by the operator/user.

The particular section of the musical score can be numbered and that number displayed in Section tab 35b.

The Bar and Beat identifiers tabs 35c and 35d report the current position of the prerecorded media/video based on previously entered data as described herein below. This display will align with the musical score to which the video was previously adapted and the user can use this display to ensure it is matched up with the live performance. The numbers displayed in these boxes are also not directly adjustable by the user during the performance but are visual informational readings of the time passing checked against the stated previously entered data. These numbers are constantly changing and updating in real-time to display the current position of the piece.

Figure 6:
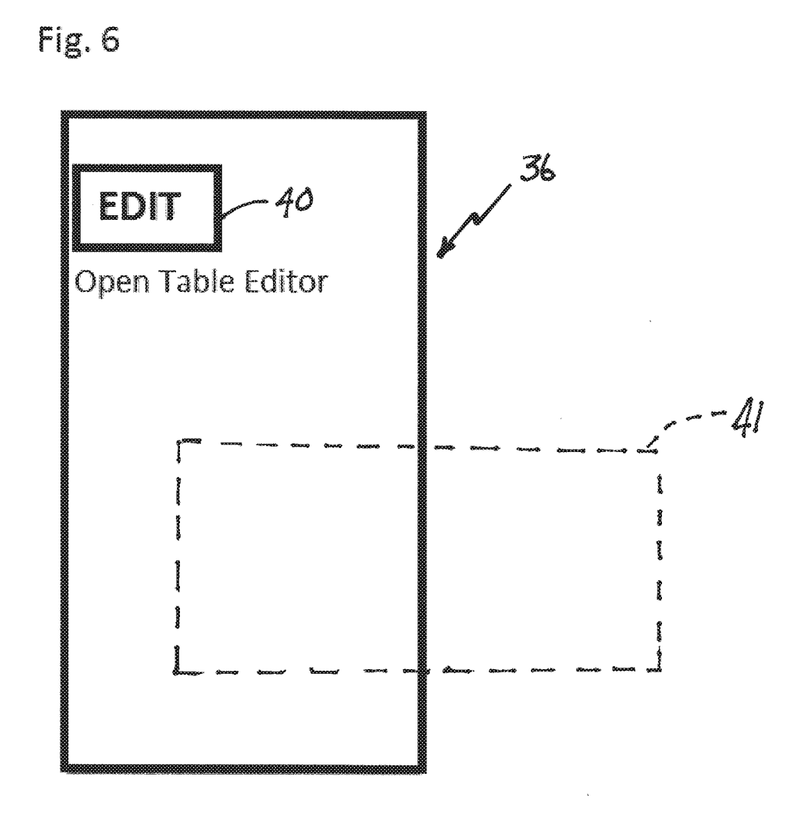
FIG. 6 shows a detailed view of the section marker table of FIG. 3.

As seen in FIG. 6, section marker table display area 36 includes a section table edit button 40 which is used to open a new window that shows a table editor display 41, an example of which is seen in Table 1 below. Table 1 contains all the preparation data required to be entered before a performance of a prerecorded video file can take place. This information is created for each such media file to create a tempo map of the file that will identify the prerecorded video's exact position for each moment of performance in relation to the musical score of the live event. This data represents the unaffected tempo before the playback speed is modified by the tempo adjustment window 32.

TABLE 1

| Section | Start Bar | Frames Per Beat | Tempo | Signature 1 | Signature 2 |
|---|---|---|---|---|---|
| 1 | 1 | 18 | 90 | 4 | 4 |
| 2 | 31 | 18 | 92 | 4 | 4 |
| 3 | 47 | 18 | 85 | 5 | 4 |

The "Section" column displays and contains the numerical ordering of sections within the digital video file. Each time a value changes in one of the other table columns it requires the creation of a new section.

The "Start Bar" column displays and contains the starting bar or measure for each section. This information is collected by the user from the musical score of the live event.

The "Frames Per Beat" column displays and contains information that is the result of the following mathematical calculation wherein: Frames per second (fps)×60=Frames per Minute (fpm), from which it follows that: Frames per Minute/Current Tempo=Frames per Beat (fpb). Thus, in an example where a film/video is rendered at 30 fps and the unaffected tempo of the event it is to be synced to is 120 beats per minute (bpm), we would calculate 30 (fps)×60=1800 (fpm) and 1800 (fpm)/120 (bpm)=15, giving us 15 fpb.

The "Tempo" column displays and contains data that is the unaffected tempo of the music of the video file. This data and its entry and significance will be explained in greater detail below "Signature 1" column, using standard music notation practice, is the numerator or top number in time signature nomenclature and designates how many beats occur within each bar or measure of music for a given section thereof. This number is also entered into this column prior to the performance.

"Signature 2" column again, using standard music notation practices, is the denominator or bottom number in a given time signature and represents the type of note that equals one beat, e.g. where 4=a quarter note, 8=an eighth note, etc.

The data in Table 1 then describes the time and tempo parameters in the prerecorded digital video file that is to be synced to the live performance. Said another way, as the user manually enters these values a tempo map of the digital media is being created, which then can be used as a reference against the live event in performance as a further aid in mapping the video against the live event and showing places where the two may have fallen out of sync.

The mapping function is visually depicted on the user interface, FIG. 3, by the visual alignment window 34, which uses data from the Table Editor, seen for example in Table 1, to produce the visual metronome. Assuming the tempo indicator 38 is set at 100% and both the media file and live event begin simultaneously, the visual metronome in the visual alignment window 34 will match the tempo of the live performance until that time as the live event drifts from the "perfect" unaffected tempo entered into the Table Editor. Once this drift occurs the operator will see and hear the live performance go out of sync with the video by seeing that the flashing visual metronome in the visual alignment window 34 begins to flash out of time with what they are hearing with respect to the tempo of the live event. A simple correction by the operator by adjusting the tempo indicator 38 up or down will bring the video back into sync with the live event.

Figure 7:
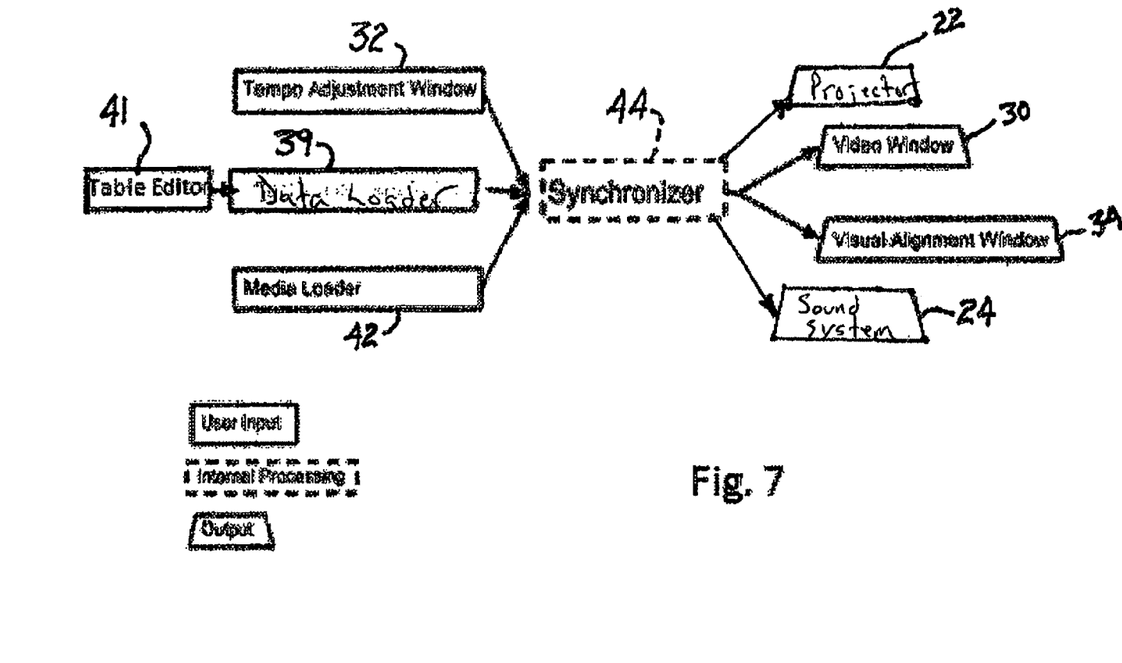
FIG. 7 shows a basic software flow and control chart.

An overall view of the general flowchart of software 28 can be understood by reference to FIG. 7. The process begins with the Table Editor window which contains data manually entered by a user prior to a performance. A media loader 42 is provided to load the video file to be synced into the software 28. The user enters the data as per table 1 into software program 28 and a data loader 39 loads that data into software 28. A synchronizer 44 collects data from the tempo adjustment window 32, the section marker table 36 and the media loader 42 to calculate the data functions needed to achieve the sync. From synchronizer 44 output signals are delivered to video window 30, projector 22, sound system 24 and visual alignment window 34.

Figure 8:
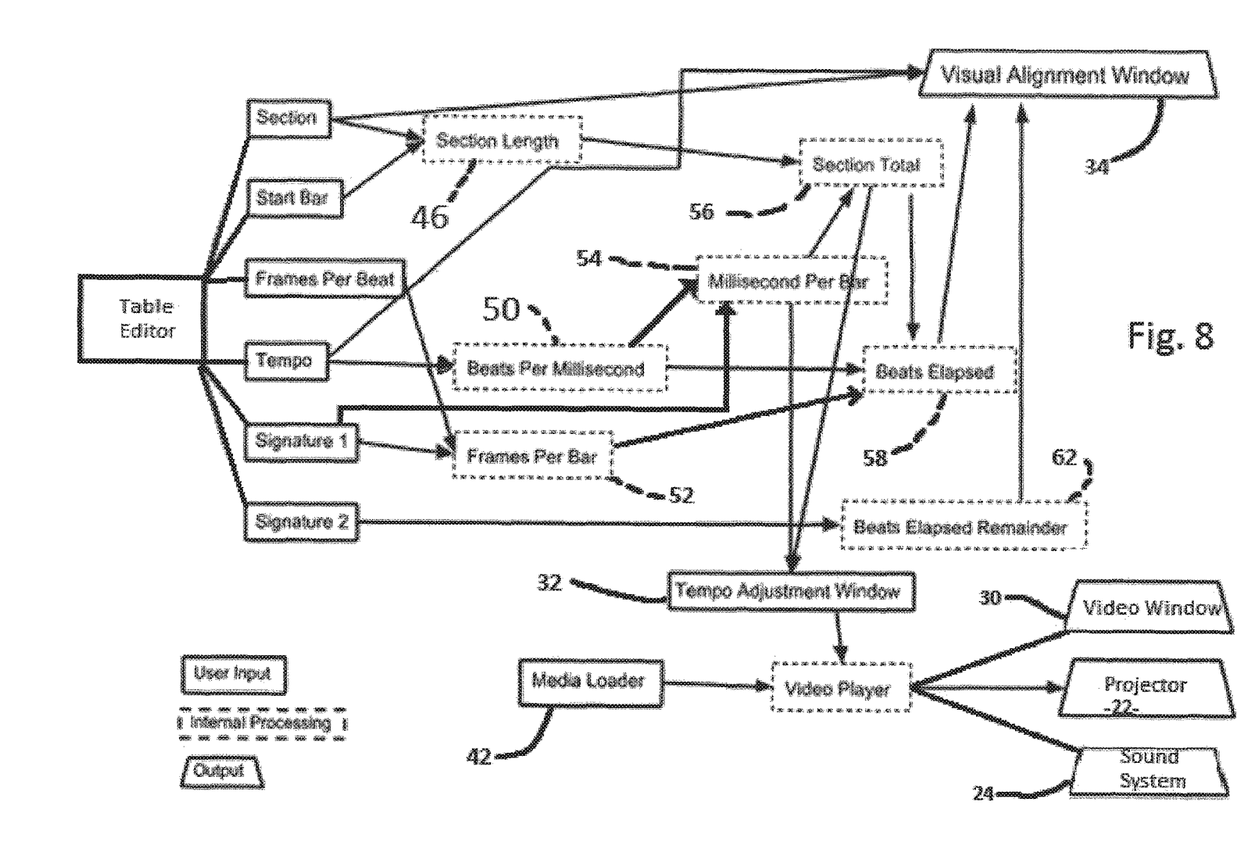
FIG. 8: shows a detailed view of the software flow and control chart of the synchronizer of FIG. 7.

A detailed flowchart of the synchronizer 44 processes can be understood by referring to FIG. 8 in combination with sample calculations relative to the data of Table 1 set out below.

For each section of the musical score, the number of beats per measure is taken from the "Signature 1" column. In the case of section 1 in the above example that number is 4. The tempo in the Tempo column, which in this example has been manually entered, calculates how long each beat should last. At a tempo of 90 beats per minute, each beat gets 667 Milliseconds. Thus it follows that, 60,000/[BPM]=Beats Per Millisecond, which is represented in box 50 of FIG. 8. At a given frame rate of 18 frames per beat: 18 Frames=667 Milliseconds=1 beat. With this information, the frames per bar can be derived as: Frames per Bar, (box 52), is equal to [Frames per Beat]×[Signature 1] and thus producing Milliseconds per Bar, (as represented by box 54), which equals [Beats per Millisecond], (box 60)×[Signature 1] resulting, in this example, as 72 Frames per bar, and 2,668 milliseconds per bar. The video then "knows" to run at the rate of 72 Frames per Bar, seen with respect to box 52, from a start bar where: the Section Length, 46=[Section # at Start Bar]−[Section #+1 at Start Bar]. In our example then, Section 1 start bar=1, Section 2 start bar=31. Therefore, 1−31=30 (absolute value). Therefore, the video will run at the current frames per beat for 30 bars where: the Section Total, box 56, =Milliseconds per bar, box 54, xSection Length, box 46, which in the present example, would be 2,668 (milliseconds per bar)×30, which equals 80,040 milliseconds. Reduced for simplicity to 80.04 Seconds.

To locate each beat within a bar we calculate: Beats Elapsed, box 58, =(Section Total), box 56, /(Beats per Millisecond), box 60, /(Signature 1). In this example then: 80,040/667=120/4=30 wherein the score should then be at the beginning of bar 30. Any remainder from this last function is rounded to the nearest 0.25, then applied as:
(Beats Elapsed Remainder), box 62, ×(Signature 2)+1=Beat Division, thus resulting in:
:00 (no remainder)=Beat 1
:25=Beat 2 of measure from Beat Elapsed), box 58.
:50=Beat 3 of measure from Beat Elapsed, box 58.
:75=Beat 4 of measure from Beat Elapsed, box 58.

It is important to note that this calculation does not affect the playback speed of the digital media itself at all. This calculation only determines the "ideal" unaffected speed as the media progresses. The speed change is calculated based on these numbers multiplied by the manual tempo adjustment performed in the tempo adjustment window 32.

In order to play at different speeds, software 28 simply needs to take the given frames per second of the selected file, and perform the following formula: New Frames Per Second=Frame Rate×Speed. Therefore, if the file is using 32 frames per second, which the program will quickly know from the file header information, then the computer can be told to play the file 32 frames for every second, when given the speed of 100%. Thus, 32=32×100%. However, when given another speed variable, the software can be told to distribute a different amount of frames over the same period of time, thereby slowing the video if the amount of frames per second is smaller than the initial frame rate, or speed up the video if the amount of frames per second is larger than the initial frame rate. For example, to play a video at exactly half the speed, the video player would be requested to play at 50%, which would only let in our example 16 frames elapse per second, i.e. 16=32×50%. If the video is to play at twice the speed intended, the command given would be 200%, that is, 64=32×200%.

It is important to note that this is continuous data, and the discrete data values shown are for visual reference only. Any value between 50% and 150% is possible, including any rational number within that range. For example, the operator could set the tempo to be 78%, 101%, 122.362%, etc.

The tempo indicator 38 is controlled by the operator as previously indicated by use of either a mechanical means such as a mouse, not shown, by clicking on and dragging tempo indicator 38 up or down, or virtually wherein controller has a touch screen that permits the operator to move tempo indicator 38 up or down by finger touch thereon. It can now be understood that the present invention allows for a level of sophistication in syncing video to a live performance that is not otherwise available. In most cases simply watching the video for visual cues about its position in relation to the live event is grossly inadequate. For example, a video showing a figure walking across the video's field of vision does not provide precise cues about how the video relates in time with the live event. To begin with, the pace of the walking may or may not be intended to be in time with the live event. Further, even if the walking projected in the video is designed to be in tempo with the live event, the operator has no way of knowing if the current step by the video character is aligned with the live event or if that step is one step ahead or behind its intended position in relation to the live event. By providing a visual representation of the 'score' of the live event the present invention allows for precision in keeping the video synced to a live event, both in terms of playback tempo and in terms of knowing exactly how far ahead or behind the video has fallen in relation to the live event.

Some further clarification about data values entered into the Table Editor (Table 1) is required. In current practice video files are edited using existing video editing software such as Final Cut Pro®, Adobe Premiere® or iMovie® to an existing sound recording of the source music to which the video is to be synced. This sound recording includes all of the unique tempo inaccuracies of that specific recorded performance. As a result, when the sound recording and the video are edited using such video editing software the edited video will also include allowances for all the same tempo imperfections as are found in the original sound recording. In live performance the tempo variation thereof will never match the recorded version, creating a type of distortion in the prerecorded video as compared with the current live performance.

For the most precise sync using the current invention, an 'ideal' version of the live event must be created that offers a tempo perfect version of the common musical score. The resultant musical score file will be mathematically perfect in terms of tempo. The video to be synced in live performance is first edited to sync with this tempo perfect sound file, essentially creating a prerecorded musical performance with absolutely no artistic expression in terms of tempo. This rhythmically sanitized version of the live event is used to create both the data entered into the Table Editor (Table 1) and the video file to be synced in a live setting.

Music notation software such as Finale® and Sibelius® can be employed to create the tempo perfect version of the live event. This ideal version is exported out of the notation software as an audio file, for example as a .wav or .aif file, and imported into the video editing software to be used as the soundtrack to the video. This "soundtrack" is for editing purposes only as the audio is never played in actual performance but only used as a framework to create the digital video file.

What is claimed is:

1. A computer comprising:
   a wireless transceiver device;
   a video output device;
   processor; and
   a memory device, the memory device storing instructions executable by the processor to perform data processing activities comprising:
      outputting a video signal from the video output of a media file played by a media rendering application executed by the processor at a playback rate according to input signals received via the wireless transceiver device from another computing device,
   wherein the media file includes:
      a digital video portion;
      a musical score portion;
      a tempo-accurate mapping of notes of the musical score portion to a timed sequence of the digital video portion; and
      wherein the input signals received via the wireless transceiver device from the another computing device are synchronization signals to synchronize playback of the digital video portion with a live performance of a musical score of the musical score portion according to the mapping.

2. The computer of claim 1, wherein the media file is stored on the memory device.

3. The computer of claim 1, wherein the wireless transceiver device is a BLUETOOTH device.

4. The computer of claim 1, wherein the another computing device is a tablet computer executing an app that presents a playback rate adjustment user interface within which input is received to generate signals that are received as the input signals.

5. The computer of claim 1, wherein the video output device is a video projector.

6. A method comprising:
   presenting, by a first application, a playback rate user interface including one or more user interface controls that can be manipulated to adjust a playback rate of a media file;
   receiving input within the user interface to adjust the playback rate of the media file to synchronize playback of the media file with a live performance; and
   sending a playback rate adjustment signal based on the received input to a second application that is outputs playback of the media file,
   wherein the media file includes:
      a digital video portion;
      a musical score portion; and
      a tempo-accurate mapping of notes of the musical score portion to a timed sequence of the digital video portion,
   wherein data of at least the musical score portion and the tempo-accurate mapping of notes of the musical score portion to a timed sequence of the digital video portion are present on the first computing device.

7. The method of claim 6, wherein the first and second applications are executed by different computing devices.

8. The method of claim 7, wherein the sending of the playback adjustment signal is sent wirelessly from a first computing device on which the first application executes to a second computing device on which the second application executes.

9. The method of claim 8, wherein the first computing device is a mobile computing device and the second computing device is a personal computer.

10. The method of claim 9, wherein the media file is present in whole on the second computing device.

11. A method comprising:
    outputting a video signal from a first application, the video output generated from a video portion of a media file played by a media rendering application at a playback rate according to input signals received from a second application,
    wherein the first and second applications are executed by different computing devices,
    wherein the media file includes:
       a digital video portion;
       a musical score portion; and
       a tempo-accurate mapping of notes of the musical score portion to a timed sequence of the digital video portion,
    wherein the input signals are received to synchronize playback of the video portion with a live performance of a musical score of the musical score portion according to the mapping.

12. The method of claim 11, wherein the input signals from the second application are received wirelessly by a first computing device on which the first application executes from a second computing device on which the second application executes.

* * * * *